US007315008B2

(12) United States Patent
Wessner

(10) Patent No.: US 7,315,008 B2
(45) Date of Patent: Jan. 1, 2008

(54) LASER WELDING SYSTEMS AND METHODS

(75) Inventor: Michael Wessner, Gerlingen (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 0 days.

(21) Appl. No.: 11/361,319

(22) Filed: Feb. 23, 2006

(65) Prior Publication Data

US 2006/0191883 A1 Aug. 31, 2006

(30) Foreign Application Priority Data

Feb. 25, 2005 (EP) ................................. 05004188

(51) Int. Cl.
*B23K 26/20* (2006.01)
*B23K 26/08* (2006.01)

(52) U.S. Cl. ............................ 219/121.63; 219/121.78

(58) Field of Classification Search ........... 219/121.63, 219/121.74, 121.78, 121.64
See application file for complete search history.

(56) References Cited

U.S. PATENT DOCUMENTS 5,168,141 A * 12/1992 Tashjian et al. ....... 219/121.63
5,841,097 A * 11/1998 Esaka et al. ........... 219/121.63
5,889,256 A * 3/1999 Osanai .................. 219/121.74
6,087,619 A * 7/2000 Berkmanns et al. ... 219/121.63
6,100,497 A 8/2000 Maruyama et al.
6,410,882 B1 * 6/2002 Okada ................... 219/121.74
6,608,278 B1 * 8/2003 Xie et al. ............. 219/121.64
6,770,839 B2 * 8/2004 Mangiarino et al. ... 219/121.63
2002/0003132 A1 * 1/2002 Scalzotto .............. 219/121.78

FOREIGN PATENT DOCUMENTS

JP 11-277277 A * 10/1999
JP 2001-58285 A * 3/2001

* cited by examiner

*Primary Examiner*—Geoffrey S. Evans
(74) *Attorney, Agent, or Firm*—Fish & Richardson P.C.

(57) ABSTRACT

A laser processing configuration, in particular for laser welding of three-dimensional components, includes a first optical element for dividing a laser beam into at least two partial beams, and a second optical element for focusing the partial beams. The first and the second optical element are stationarily mounted in a common housing disposed on a laser processing head in such a manner that it can be rotated.

18 Claims, 3 Drawing Sheets

26
25
8
21
8′′
19
22
23
8′
17
24
20
18

LASER WELDING SYSTEMS AND METHODS

CROSS REFERENCE TO RELATED APPLICATIONS

This application claims priority under 35 USC § 119(a) from European patent application EP 05 00 4188, filed Feb. 25, 2005. The complete disclosure of this priority application is incorporated herein by reference.

TECHNICAL FIELD

The invention relates to laser processing machines, such as those configured for laser welding of three-dimensional components.

BACKGROUND

For some laser processing operations it is known to divide a laser beam into two partial beams, and then to focus the partial beams separately onto a workpiece.

It is current practice to mount roof mirrors to the laser welding systems at the so-called C axis. This means that a rotation about the so-called B axis produces a relative motion between roof mirror and focusing mirror that, in turn, means a change of orientation of the two focuses. Moreover, in such cases it is typically necessary to remove an adaptive mirror when a roof mirror is being used, which renders automatic adjustment of the focal position impossible.

So-called bifocal mirrors are also already being used for processing three-dimensional workpieces. The double focus is realized with a focusing mirror having two different parabolic surfaces. The manufacture of these bifocal mirrors can be very expensive, and the focuses typically must be oriented in only one direction due to production specifications.

SUMMARY

This invention features a configuration of optical elements that can enable, in various aspects, double focus laser welding of three-dimensional components without changing the focusing configuration during rotation about the B axis.

According to one aspect of the invention, a laser processing machine includes a laser configured to generate a laser beam, a laser head, and a beam guidance system disposed between the laser and the laser head. The laser head contains a beam divider and a beam focuser, the beam divider configured to divide the laser beam into multiple partial beams, and the focuser configured to focus the partial beams for processing of a workpiece. The beam guidance system is configured to direct the laser beam to the beam divider of the laser head. In this aspect of the invention, the laser head includes a housing to which the beam divider and focuser are fixed, the laser head housing being rotatable with respect to the beam guidance system about a positioning axis, so as to vary an output direction of the laser head while maintaining focus of the partial beams.

In some embodiments, the beam divider is a mirror, such as a mirror that has separate facets that meet at a ridge incident to the laser beam, such that a first portion of the beam strikes one facet of the mirror, and a second portion of the beam strikes another facet of the mirror. In some cases, the ridge intersects the positioning axis, such that dividing of the beam is independent on rotational position of the laser head housing.

In some embodiments, the beam focuser is a mirror, such as a mirror sized to intercept all of the partial beams from the beam divider. The beam focuser mirror may be parabolic, for example.

In some configurations, the machine also includes an adaptable mirror positioned to intercept and deflect the laser beam upstream of the beam divider and beam focuser. The adaptable mirror is alterable to adjust focus, such as by being configured to have a curvature alterable by water pressure changes. In some cases, the adaptable mirror is secured to a second laser head housing, to which the laser head housing containing the beam divider and beam focuser is rotatably coupled. The intermediate housing may be rotatable with respect to the beam guidance system about a second positioning axis, for example.

In some embodiments, the beam divider and beam focuser are positioned to intercept the beam traveling along a first direction, and to redirect the partial beams in a second direction, such as a direction substantially perpendicular to the first direction. In some configurations, the first direction is substantially aligned with the positioning axis.

In some implementations, the machine also includes a workpiece support positioned to support a workpiece while the workpiece is processed with the focused partial beams. The machine may be in the form of a laser welder, for example.

Another aspect of the invention features a method of processing a workpiece with a laser beam. The method includes generating a laser beam and directing the generated beam to a laser head having a beam divider, a beam focuser, and a housing containing both the beam divider and beam focuser and rotatable about a positioning axis. The directed beam is intercepted, divided, focused and redirected with the beam divider to form multiple partial, focused beams that engage a workpiece. The method also includes rotating the laser head housing about the positioning axis, such as to alter an output direction of the laser head, while maintaining beam focus.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
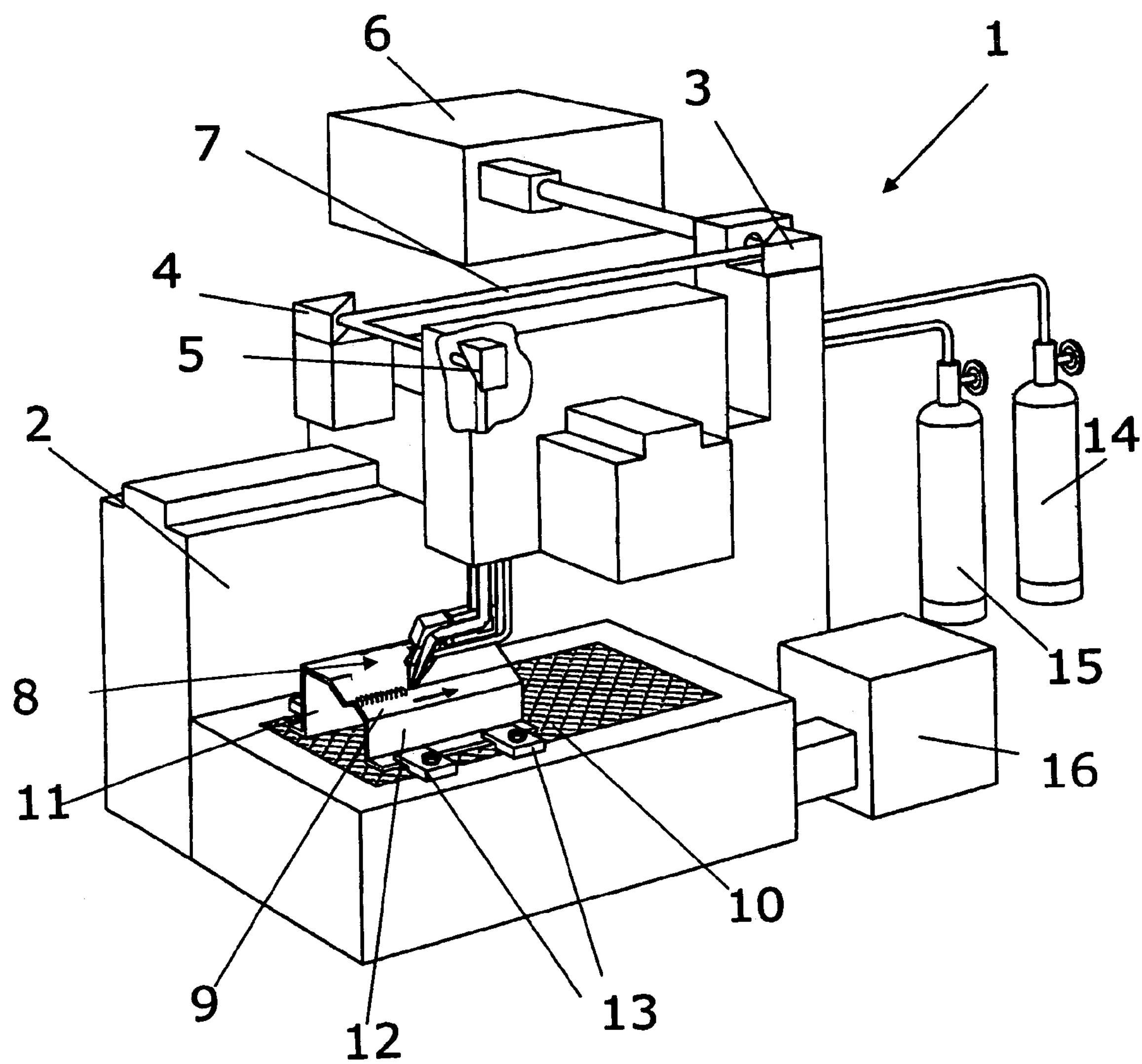
FIG. 1 shows the structure of a laser welding system.

FIG. 1 shows the structure of a laser welding system 1. A machine frame 2 carries the motion unit of the machine and the beam guidance system including deflecting mirrors 3 to 5 for a laser beam 7 generated in the laser 6.

A laser welding head 8 comprising a deflecting mirror and a focusing mirror can be moved via two axes of rotation in three directions to optimally process a weld seam 9 for joining two components 11 and 12 which are disposed on a support 10. The components 11 and 12 are fixed by a clamping device 13. For laser welding, process gases (working gas 14, protective gas 15) can be supplied to the laser welding head 8 and be extracted via a suctioning means 16.

Figure 2:
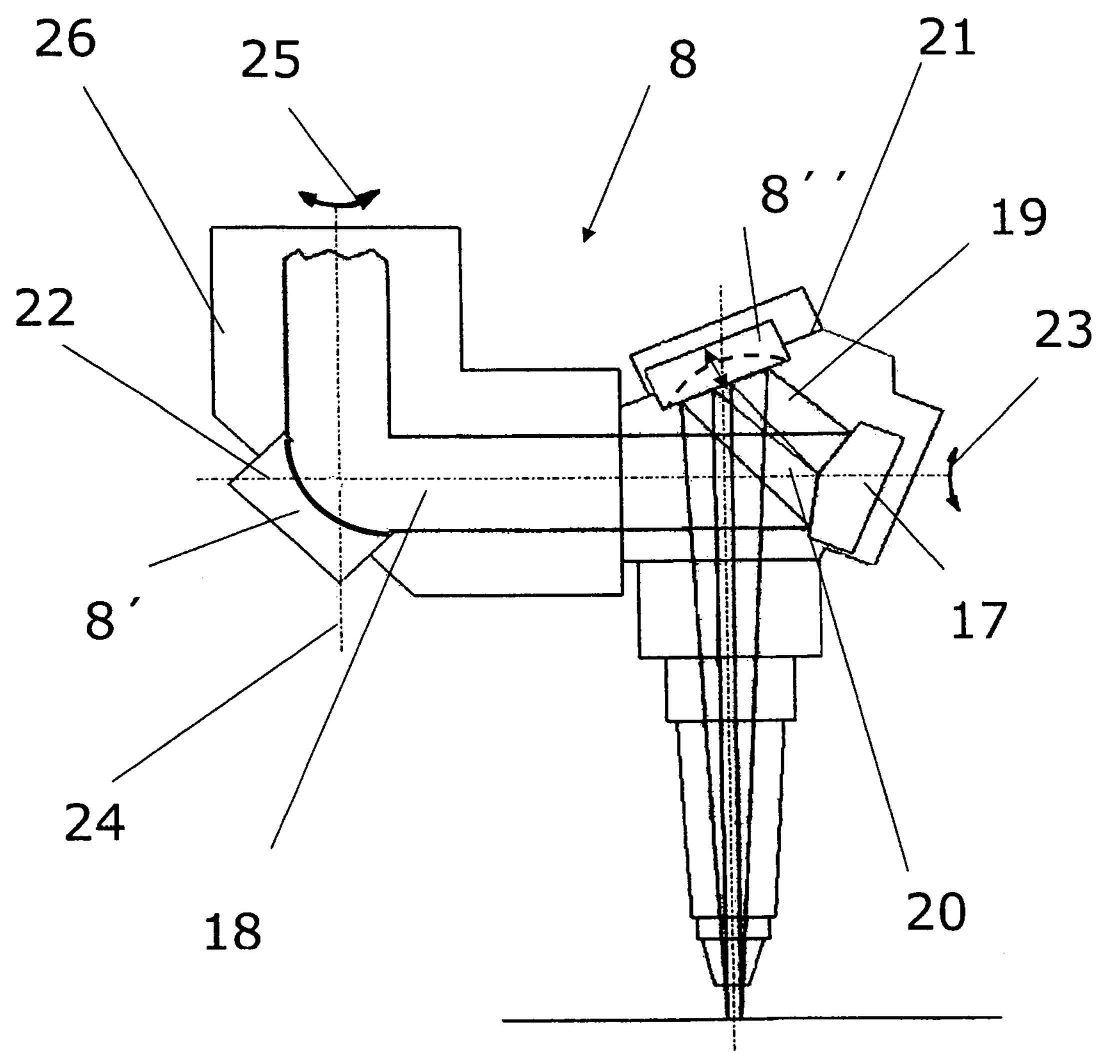
FIG. 2 is a schematic cross-section of a laser processing head.

Refering to FIG. 2, a double focus is generated in the laser welding head 8 using a roof mirror 17. The roof mirror 17 divides the raw beam 18 into two partial beams 19, 20 that are then imaged as double focus using a parabolic focusing mirror 8". The roof mirror 17 and the focusing mirror 8" are stationarily housed in a common housing 21. That means that these two mirrors 17, 8" cannot be moved relative to each other. For this reason, the orientation of the two focuses cannot be changed during rotation about a positioning axis 22 (B axis) in accordance with the double arrow 23. Three-dimensional components can therefore also be welded using a double focus. To realize a desired change in orientation, the roof mirror 17 can be rotated through 90°. The positions of the roof mirror 17 and the focusing mirror 8" in the housing may also be exchanged. The holders of the two mirrors may be almost identical or be designed to render an exchange of the mirrors as simple as possible. The focal length can be influenced by swapping the mirrors. The mirror configuration moreover also includes an adaptive mirror 8' whose curvature can be changed by water pressure. In this fashion, the focal position can be automatically changed even during double focus welding. The adaptive mirror 8' is located in a housing 26 which is disposed in such a manner that it can be rotated about a further positioning axis 24 (C axis) of the laser processing system in accordance with the double arrow 25. Exchange of the adaptive mirror 8' is easy since it is housed in a separate housing separately from the other two mirrors.

Figure 3:
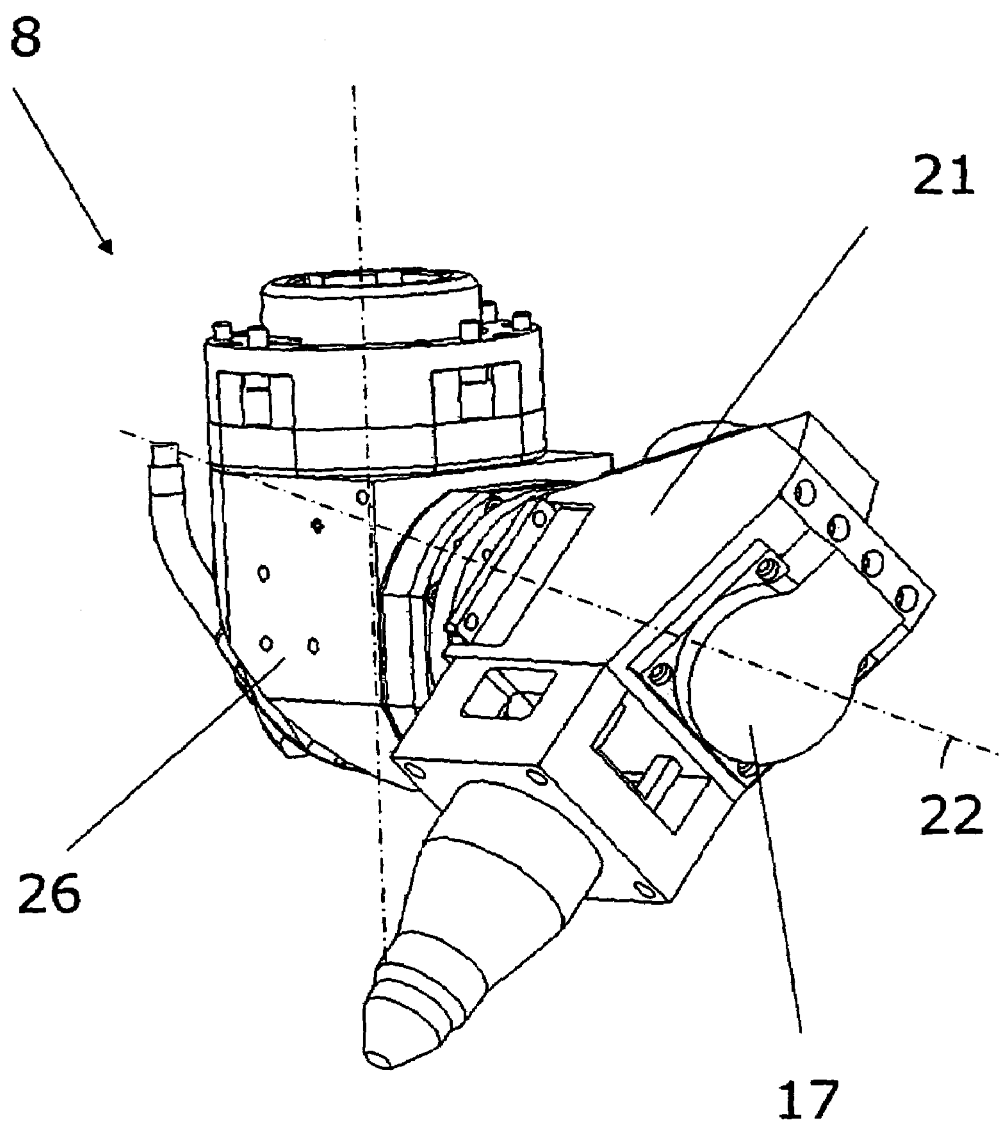
FIG. 3 is an external perspective view of a laser processing head.

FIG. 3 shows how the assembled laser welding head 8 can be pivoted about the positioning axis 22. FIG. 3 also clearly shows that the laser welding head 8 comprises two rotatable housings 21, 26. This permits installation and removal of the mirrors irrespective of each other. In particular, access to the adaptive mirror is facilitated.

A number of embodiments of the invention have been described. Nevertheless, it will be understood that various modifications may be made without departing from the spirit and scope of the invention. Accordingly, other embodiments are within the scope of the following claims.

What is claimed is:

1. A laser processing machine comprising a laser configured to generate a laser beam;

a laser head containing a beam divider and a beam focuser, the beam divider configured to divide the laser beam into multiple partial beams, the focuser configured to focus the partial beams for processing of a workpiece; and a beam guidance system disposed between the laser and the laser head and configured to direct the laser beam to the beam divider of the laser head;

wherein the laser head includes a housing to which the beam divider and focuser are fixed, the laser head housing being rotatable with respect to the beam guidance system about a positioning axis, so as to vary an output direction of the laser head while maintaining focus of the partial beams.

2. The machine of claim 1 wherein the beam divider comprises a mirror.

3. The machine of claim 2 wherein the beam divider mirror has separate facets that meet at a ridge incident to the laser beam, such that a first portion of the beam strikes one facet of the mirror, and a second portion of the beam strikes another facet of the mirror.

4. The machine of claim 3 wherein the ridge intersects the positioning axis, such that dividing of the beam is independent on rotational position of the laser head housing.

5. The machine of claim 1 wherein the beam focuser comprises a mirror.

6. The machine of claim 5 wherein the beam focuser mirror is sized to intercept all of the partial beams from the beam divider.

7. The machine of claim 5 wherein the beam focuser mirror is parabolic.

8. The machine of claim 1, further comprising an adaptable mirror positioned to intercept and deflect the laser beam upstream of the beam divider and beam focuser, wherein the adaptable mirror is alterable to adjust focus.

9. The machine of claim 8 wherein the adaptable mirror is configured to have a curvature alterable by water pressure changes.

10. The machine of claim 8 wherein the adaptable mirror is secured to a second laser head housing, to which the laser head housing containing the beam divider and beam focuser is rotatably coupled.

11. The machine of claim 10 wherein the intermediate housing is rotatable with respect to the beam guidance system about a second positioning axis.

12. The machine of claim 1 wherein the beam divider and beam focuser are positioned to intercept the beam traveling along a first direction, and to redirect the partial beams in a second direction.

13. The machine of claim 12 wherein the second direction is substantially perpendicular to the first direction.

14. The machine of claim 12 wherein the first direction is substantially aligned with the positioning axis.

15. The machine of claim 1 further comprising a workpiece support positioned to support a workpiece while the workpiece is processed with the focused partial beams.

16. The machine of claim 1 comprising a laser welder.

17. A method of processing a workpiece with a laser beam, the method comprising generating a laser beam;

directing the generated beam with a beam guidance system to a laser head having a beam divider, a beam focuser, and a housing containing both the beam divider and beam focuser and rotatable about a positioning axis relative to the beam guidance system;

intercepting and dividing the directed beam with the beam divider to form multiple partial beans;

focusing and redirecting the multiple partial beams;

engaging a workpiece with the redirected, focused, partial beams to process the workpiece; and rotating the laser head housing about the positioning axis to vary an output direction of the laser head while maintaining focus of the multiple partial beams.

18. The method of claim 17 wherein rotating the laser head housing about the positioning axis alters an output direction of the laser head.

* * * * *